A. PICKEN.
SORTING MACHINE.
APPLICATION FILED MAY 28, 1908.

941,270.

Patented Nov. 23, 1909.
7 SHEETS—SHEET 1.

Fig. 1.

Witnesses
Jas. W. McCathran
B. W. Foster

Archibald Picken,
Inventor

E. G. Siggers
Attorney

A. PICKEN.
SORTING MACHINE.
APPLICATION FILED MAY 28, 1908.

941,270.

Patented Nov. 23, 1909.
7 SHEETS—SHEET 3.

Witnesses
Jas. K. McCathran

Archibald Picken, Inventor
By C. G. Biggers
Attorney

UNITED STATES PATENT OFFICE.

ARCHIBALD PICKEN, OF NORFOLK, VIRGINIA.

SORTING-MACHINE.

941,270.

Specification of Letters Patent. Patented Nov. 23, 1909.

Application filed May 28, 1908. Serial No. 435,563.

*To all whom it may concern:*

Be it known that I, ARCHIBALD PICKEN, a citizen of the United States, residing at Norfolk, in the county of Norfolk and State of Virginia, have invented a new and useful Sorting-Machine, of which the following is a specification.

The sorting of railway tickets that have been used and particularly those of the small card type is now done by hand, and ordinarily requires a considerable number of persons in the railway offices of each company.

The primary object of the present invention is to provide novel, entirely practicable and expeditious means for mechanically sorting such tickets, thus greatly reducing the expense of sorting, and also materially decreasing the chance of mistakes being made. In this connection, it may be stated that while the invention is particularly devised for employment in connection with railway tickets, it is by no means limited to such use, inasmuch as there are features that may undoubtedly be successfully employed in connection with sorting mechanism for other articles.

An embodiment of the invention that has proven satisfactory, is illustrated in the accompanying drawings and is described in the following specification, but it will be evident from an inspection of the claims hereto appended that the invention is not limited to the structure disclosed.

In the drawings.

Similar reference numerals designate corresponding parts in all the figures of the drawings.

Figures 4, 12:
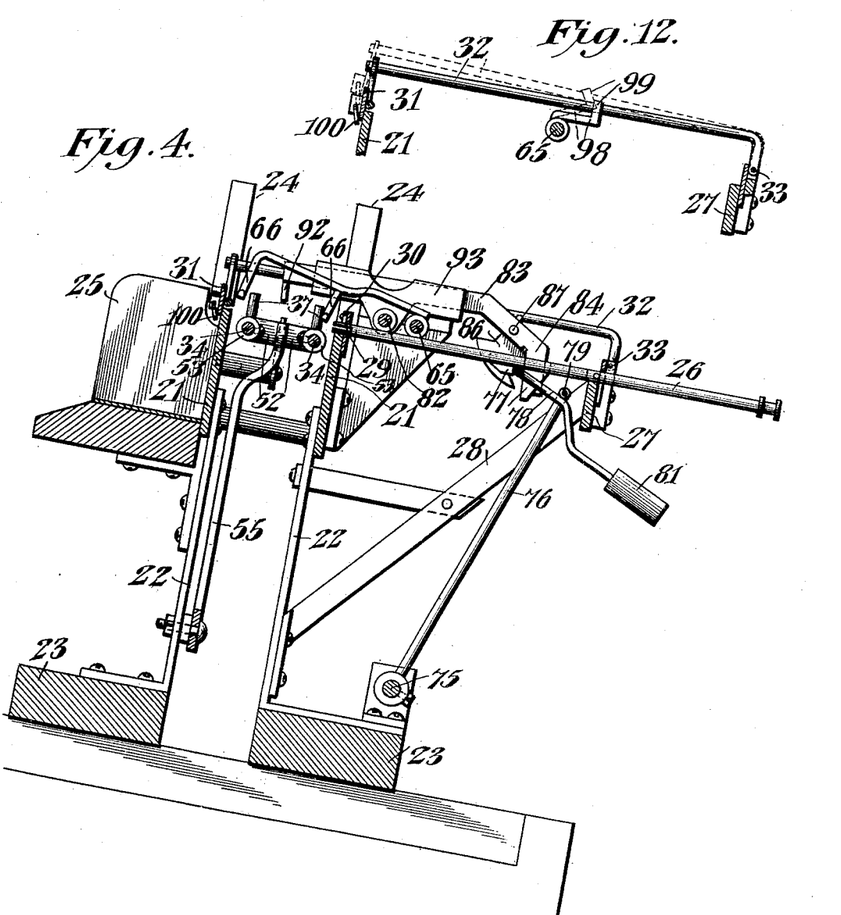
Fig. 4 is a vertical cross sectional view through the machine.
Fig. 12 is a detail sectional view showing the means for effecting the elevation of the movable guide rail.

In the embodiment illustrated, a suitable supporting frame is provided, which includes a pair of longitudinal bars 21 supported on standards 22, which are mounted on a suitable base 23. The upper edges of the bars 21 constitute tracks or guides for the tickets or other articles to be sorted, and located at one end thereof, is a magazine 24 for the cards or tickets, said bars passing beneath, and constituting the bottom of the magazine, and the walls of said magazine being so arranged that one card can pass at a time from the bottom of the stack placed in the magazine into the passageway formed by the tracks or guides. Arranged along one of the bars 21 are receivers or compartments 25 for the tickets sorted, the same having open tops and open outer sides. Coöperating with each of these receivers or compartments is an expelling or ejecting plunger 26, the same operating transversely of the passageway for the tickets, their inner ends being normally located on the adjacent bar 21, their rear or outer portions being supported by another bar 27 that is carried on bracket arms 28 fastened to the standards 22. The inner ends of the plungers 26 are provided with notches 29, which, with the upper edge of the bar 21 on which they rest, and short sections of angle bars 30, shown in Fig. 13, form a guideway for the rear edges of the tickets. The guideway for the outer edge of the tickets comprises the upper edge of the outer bar 21, and a vertically movable guide rail or gate 31, which, as shown clearly in Fig. 12, is supported on swinging arms 32 pivoted at their rear ends, as shown at 33. The gate 31, which is common to all the receivers or compartments 25, is periodically opened, as will be hereinafter more fully described, so as to permit the tickets to be discharged into their respective compartments.

Figure 1:
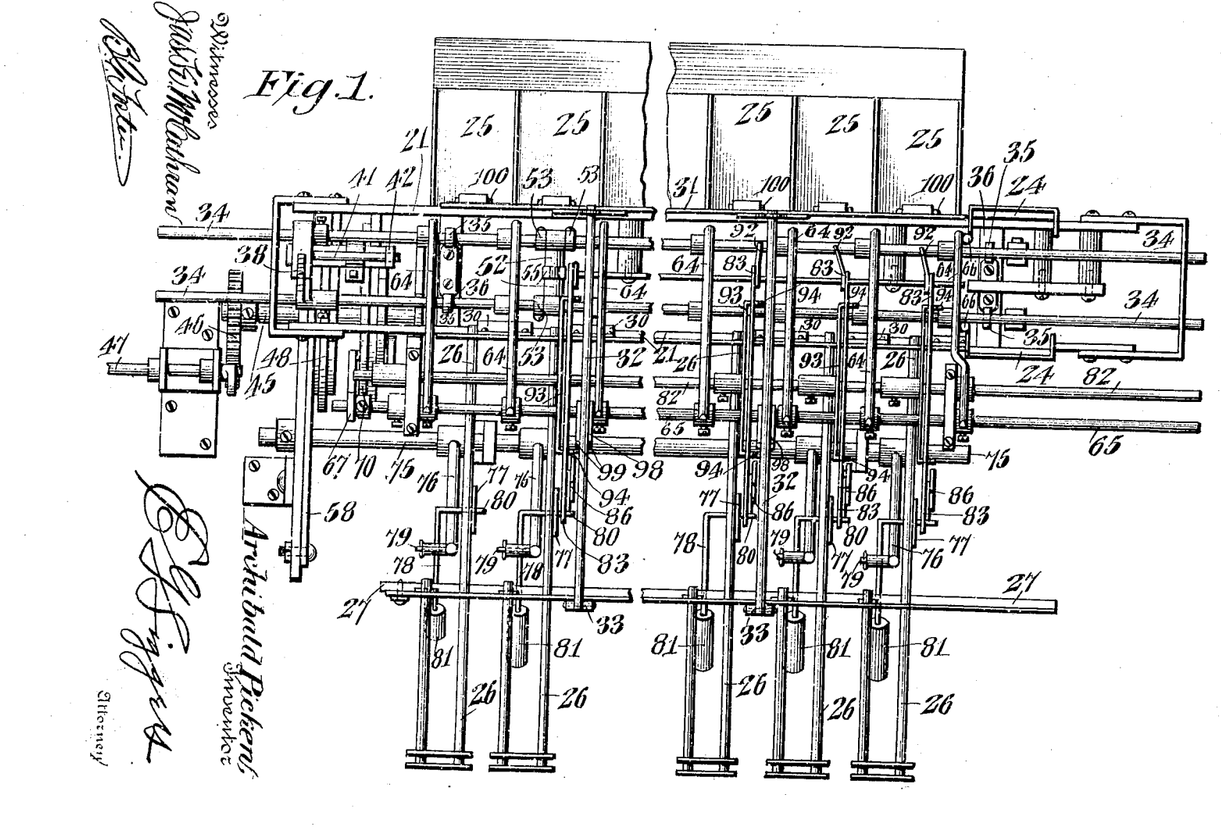
—Figure 1 is a plan view of the machine with the central portion broken away.
Figures 2, 11:
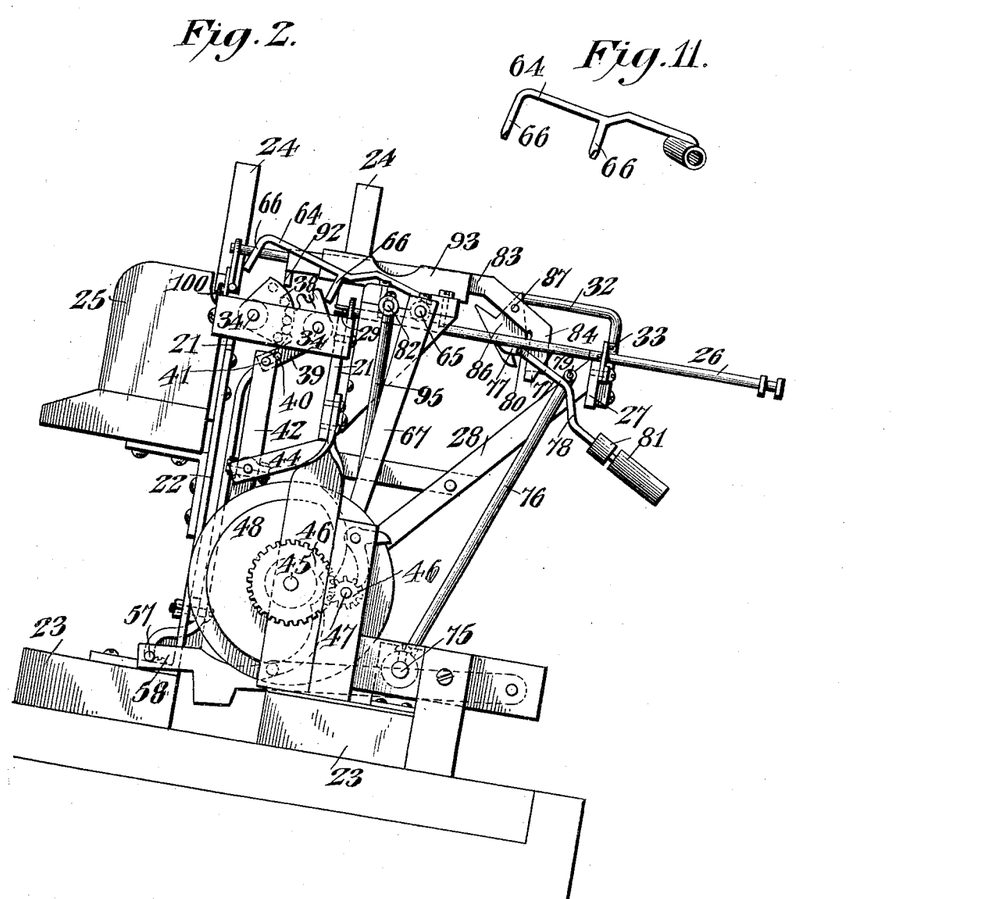
Fig. 2 is an end elevation of the same.
Fig. 11 is a detail perspective view of one of the stops or positioning devices for the tickets.

For the purpose of removing the tickets successively from the bottom of the magazine 24, carrying them step by step through the passageway and presenting them successively to each of the plungers 26 until the proper one to eject the same is reached, as hereinafter explained, the following mechanism is employed. A pair of reciprocatory rock shafts 34 is employed that are slidably and rotatably mounted in suitable bearings 35 mounted on pieces 36 that bridge the space between the bars 21. These rock shafts are provided at intervals with sets of ticket or card-engaging fingers 37 arranged a distance apart equal to the width of the tickets or other articles to be sorted. The rock shafts are geared together, as shown at 38 in Figs. 2 and 16, and one of the gears has an arm 39 provided with a slot 40. A rod 41, engaged in said slot, is carried by the upper spaced arms 42 of a lever fulcrumed between its ends, as illustrated at 43 on a bracket 44 that is fastened to one of the bars 21. A cam shaft 45, journaled in any suitable manner, below the bars 21 and geared as shown at 46 to a suitable driving shaft 47, is provided with a disk 48, on one side of which is fastened a cam 49 having a track or groove 50. Engaged in this track or groove is a pin 51 carried by the lower end of the lever 42. It will thus be clear that upon the rotation of the disk 48 and cam 49, the lever will be caused to swing, thereby rocking the arms 39, and through the gearing 38, partially rotating the rock shafts 34.

Figure 3:
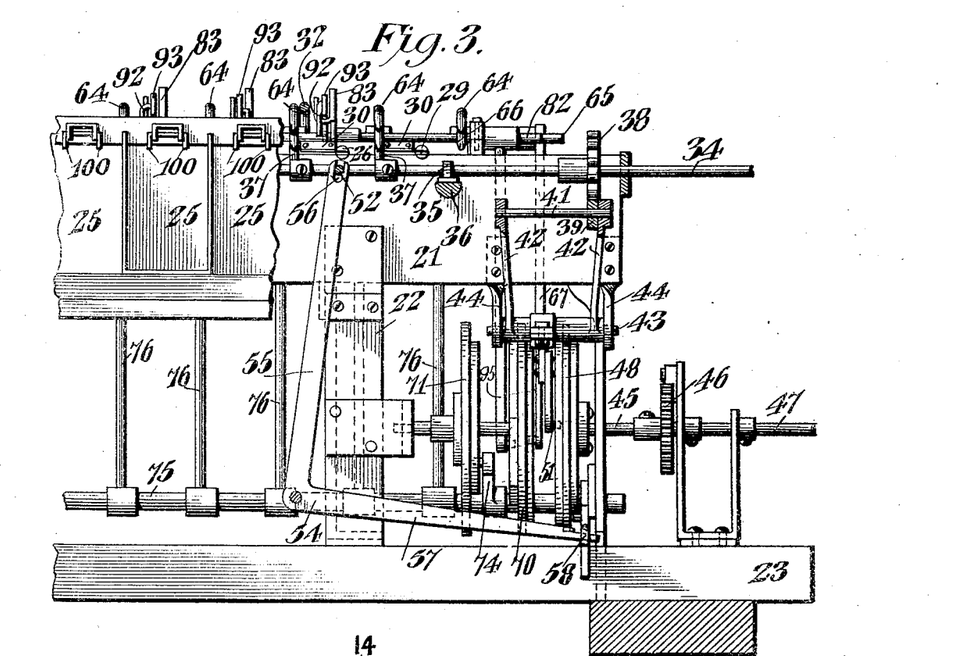
Fig. 3 is a side elevation of one end portion, parts thereof being illustrated in section.
Figures 6, 14, 20:
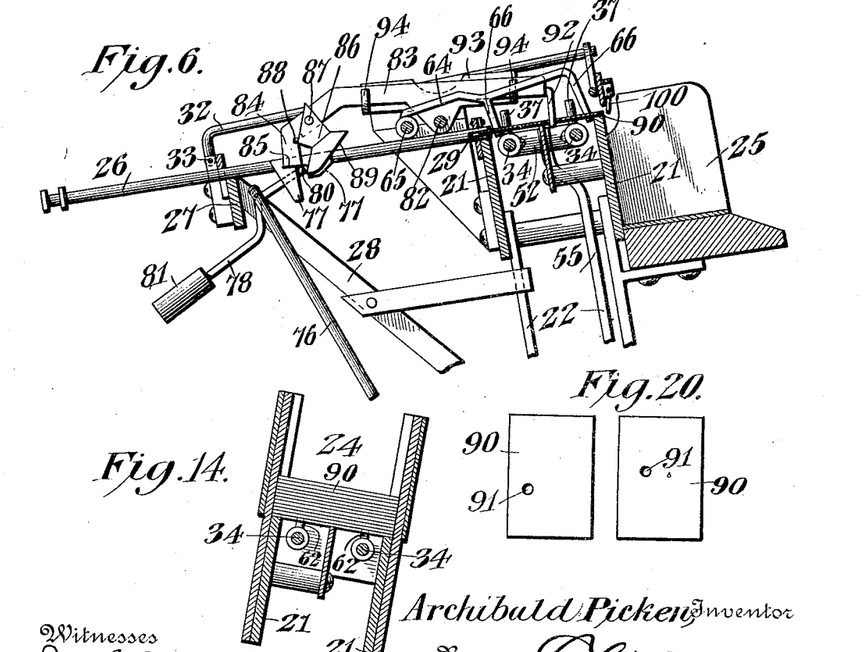
Fig. 14 is a sectional view on the line 14—14 of Fig. 13.
Fig. 20 is a detail plan view of two tickets illustrating the different relative positions of the openings therethrough.
Figure 13:
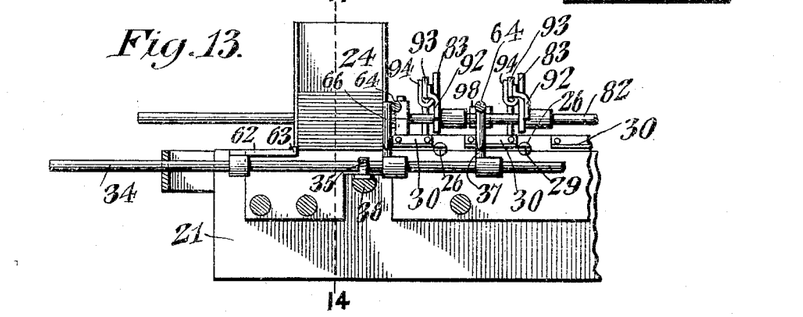
Fig. 13 is a longitudinal sectional view through the ticket magazine and feeding mechanism.
Figures 15, 16, 17, 18, 19:
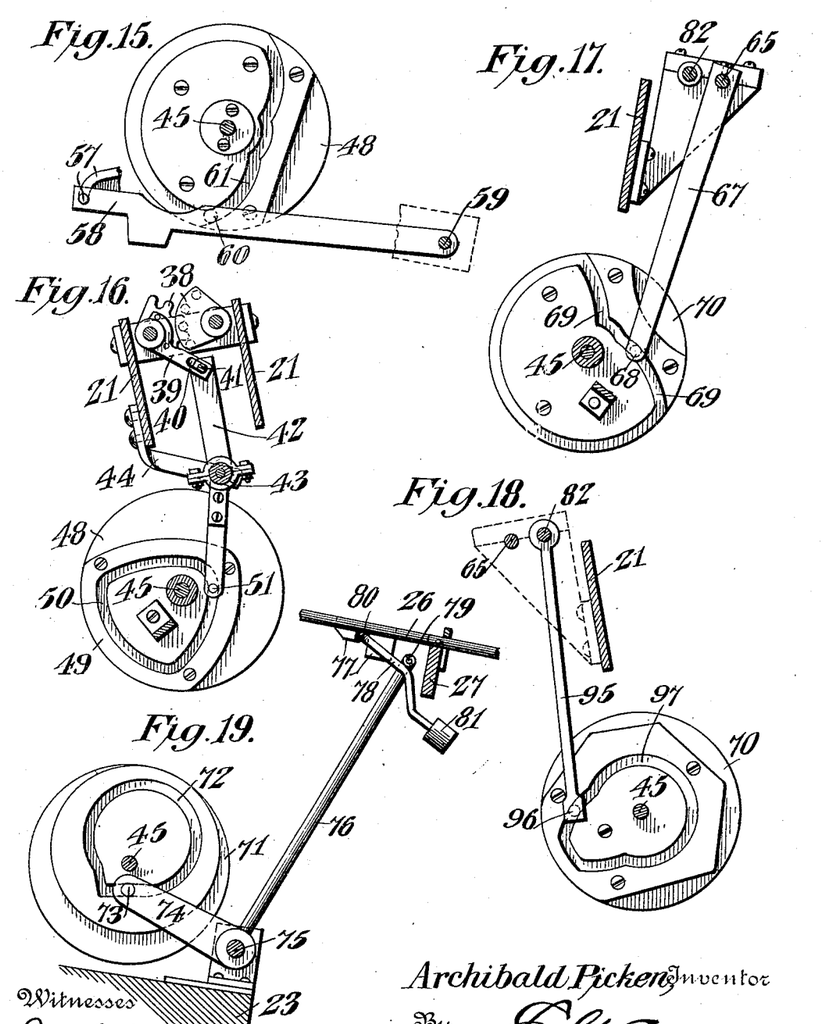
Fig. 15 is a detail view of the cam and associated mechanism for effecting the longitudinal movement of the conveyer.
Fig. 16 is a view of the mechanism for effecting the rotary movement of the conveyer rock shafts.
Fig. 17 is a detail view of the cam and associated mechanism for operating the stop fingers and movable rail.
Fig. 18 is a detail view of the cam and operating mechanism for actuating the selectors.
Fig. 19 illustrates the cam and mechanism for operating the ejector plungers.

In order to effect the reciprocation of the rock shafts, the mechanism shown most clearly in Figs. 3 and 15 is employed. A bridge-piece 52, in which the shafts 34 are journaled, connects said shafts, and is held against longitudinal movement thereon by collars 53 secured to the shafts on opposite sides of said bridge-piece. A bell crank 54, journaled on the lower portion of the frame, has an upstanding arm 55 provided in its upper end with a slot 56 which receives the central portion of this bridge-piece. The other arm 57 of the bell crank is engaged in the end of a lever 58 located at right angles thereto and fulcrumed at its opposite end, as shown at 59. This lever has a pin 60 that operates in a cam groove or way 61 formed upon the opposite side of the disk 48 to that having the cam 49. It will thus be evident that upon the rotation of the disk 48, the lever 58 will be swung back and forth, thereby swinging the bell crank 54, and because of its engagement with the bridge-piece, effecting the longitudinal movement of the shafts. Referring now to Figs. 13 and 14, it will be noted that a pair of supporting arms 62 are employed that operate beneath the magazine 24, and these arms are provided with upstanding terminals 63 constituting ticket or card delivery devices.

The operation of the above described conveyer or ticket carrying means is substantially as follows: Because of the peculiar arrangement of the cams above described, upon the longitudinal movement of the rock shafts 34 in one direction, said fingers 63 are held upright. At the conclusion of their stroke in this direction, the cam 49 operates to rotate the shafts sufficiently to depress the fingers, and they are maintained in depressed relation during and until the completion of the return stroke of the shaft. They are then swung to elevated position, and the first stroke is repeated. It will thus be evident that the fingers 63 will successively engage the lowermost ticket in the magazine and expel the same into the passageway or guide and into position in line with the first plunger. Upon the next reciprocation, the succeeding ticket will be removed from the magazine, and the first ticket will be carried to the second plunger and so on through the entire passageway or until ejected, as hereinafter set forth.

For the purpose of properly positioning and holding the tickets during the retrograde movement of the conveyer above described, swinging arms 64 are employed that are mounted on a rock shaft 65, and have depending spacing fingers 66 that are adapted to drop between the tickets adjacent to the ticket-engaging fingers 37. The rock shaft 65, as shown more particularly in Fig. 17, has secured thereto a crank arm 67 provided at its free lower end with a pin 68 that operates in a camway 69 formed upon one side of a disk 70 that is fast to the cam shaft 45. The arrangement of this cam-way is such that the shaft 65 is turned to lower the fingers 66 just before the rock shafts 34 are turned to depress the ticket-engaging fingers 37, and they remain depressed until the retrograde movement of said fingers 37, the fingers 66 rising as the fingers 37 rise. It will thus be clear that the tickets are positively held against retrograde movement with the conveyer, and during such retrograde movement the expelling action takes place, as hereinafter explained so that the fingers 66 constitute guides for any tickets expelled.

The means for effecting the operation of the ejecting plungers 26, and consequently the expulsion of predetermined tickets will now be explained. Referring to Fig. 19, it will be noted that still another disk 71 is secured to the cam shaft 45, and is provided on one side with a cam groove 72 in which is engaged a pin 73 carried by the free end of a crank arm 74. This arm is fast to a rock shaft 75 that carries a series of upstanding crank arms 76, one arm being preferably employed for each plunger. Each of said plungers is provided on its under side with a pair of spaced depending lugs 77 forming a socket between them, the opposite walls of said sockets constituting shoulders. A dog 78, pivoted between its ends on each of the arms 76, as shown at 79, is provided with an offset terminal tooth 80 adapted to engage between the lugs 77 of the adjacent plunger, and is urged to such engagement by a weight 81 carried by its lower end. With the end plunger as shown in Fig. 19, the tooth 80 always remains in its socket, but with the others, as illustrated in Figs. 5-8 inclusive, their engagement and disengagement is automatically controlled. To this end, a rock shaft 82 is employed, and loosely fulcrumed on said rock shaft are a series of controlling or selector levers 83, one being employed for each plunger. The rear ends of these levers are downturned, as shown at 84, and their lower edges 85 are adapted to swing to positions across the sockets between the shoulders 77, as shown more particularly in Fig. 8. Track elements 86, pivoted as shown at 87, to the rear end portions of the levers 83, are capable of free forward swinging movement with respect to said levers, but their rearward movements are limited by stop projections 88. The lower inclined edges 89 of these track elements constitute guides for directing the teeth 80 of the dogs over the front lugs 77 and into said sockets, as is hereinafter more fully set forth. The tickets, designated 90, as shown more particularly in Fig. 20, are provided with openings 91 therethrough, the openings of tickets of different characters being differently arranged. Secured to the front ends of the selector or controlling levers 83 are downwardly extending fingers 92, and these fingers are arranged in different relative positions with respect to the tickets that are passed thereunder so that during the swinging movement of the levers, the lower ends of said fingers have fixed paths of movement, and each will pass into the openings of tickets of one predetermined character. Thus referring to Fig. 6, it will be noted that the selector finger 92 there shown, is disposed in the opening 91 of the ticket; and it will be observed that the rear lower edge 85 of the lever 83 is consequently elevated so as to permit the tooth 80 of the dog to engage in its socket. On the other hand, referring to Fig. 8, it will be noted that the opening 91 is out of alinement with the finger 92 that is arranged above the ticket. Consequently the rear edge 85 of the controlling lever 83 is in a position to prevent the tooth 80 of the dog entering the socket.

As already explained, the levers 83 are loosely fulcrumed on the rock shaft 82, but arranged alongside each lever and fixed to the rock shaft, is a stirrup member 93 that extends on opposite sides of said rock shaft, and is provided with terminal hooks 94 in which the lever is located, said lever having a limited movement with respect to the stirrup member, but being also moved to a limited extent by said stirrup member when operated by the rock shaft 82. The rock shaft 82 has secured to one end, as illustrated in Fig. 18 a crank arm 95, having at its free end a pin 96 that is engaged in the cam way 97 formed upon the opposite side of the disk 70 to that having the cam-way 69. Thus the rock shaft is periodically moved in opposite directions, the movement being sufficient to swing the selector fingers 92 upwardly above the path of movement of the tickets 90 and to swing them downwardly to a position to engage the tickets, the weights 81 on the dogs serving to swing the levers far enough to carry the fingers 92 into the openings of the tickets when the same aline with the openings therein, and thus permit the teeth of the dogs 80 to enter the sockets between the lugs 77.

Figure 5:
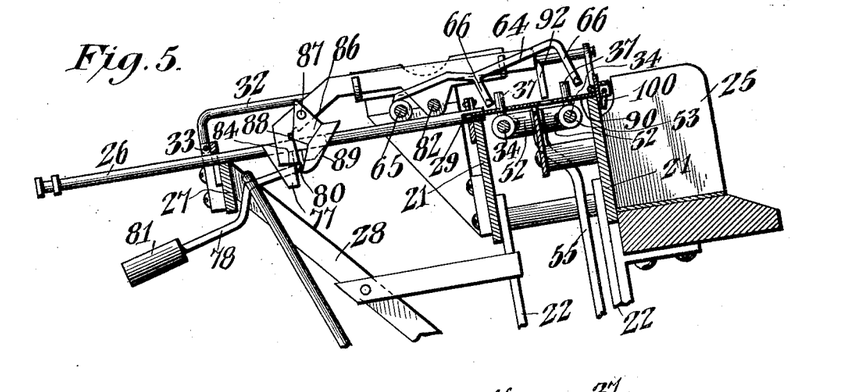
Figs. 5–8 inclusive are also cross sectional views looking in the opposite direction to Fig. 4, and showing the different positions assumed by the controlling and ejecting means for one of the tickets.
Figure 7:
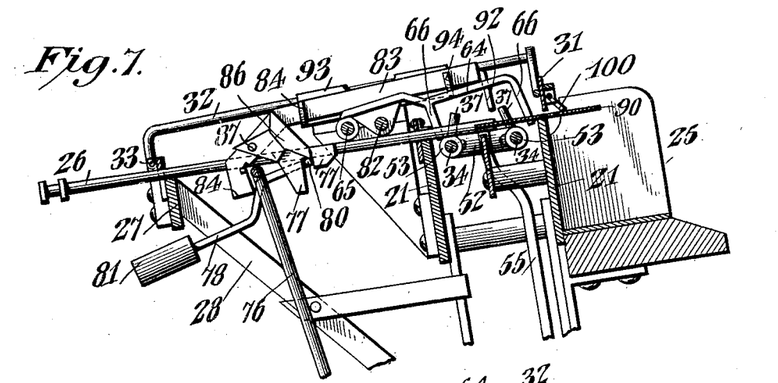
Figure 8:
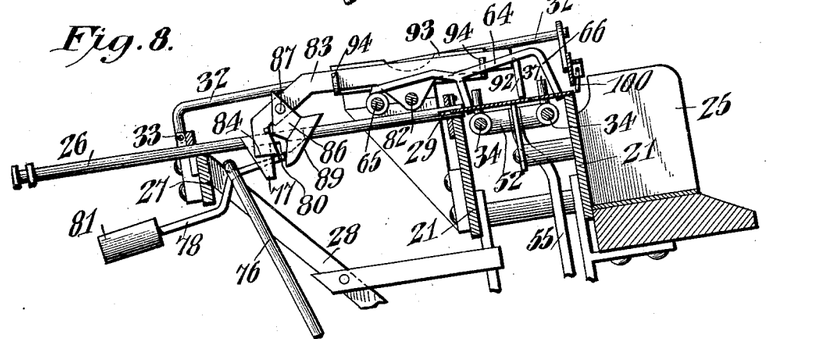
Figure 9:
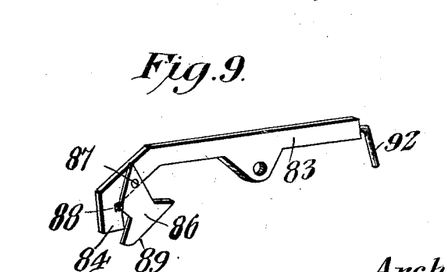
Fig. 9 is a detail perspective view of one of the selector levers.
Figure 10:
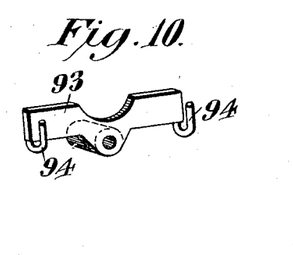
Fig. 10 is a similar view of the device for limiting the movement thereof and actuating such lever.

The operation of this portion of the structure is substantially as follows: Referring first to Fig. 5, and assuming that the ticket 90 has just been carried to the position shown by the conveyer, the rock shaft 65 is turned to depress the fingers 66, and simultaneously the rock shaft 82 is turned to partially depress the selector fingers 92, as shown in Fig. 6. If now the ticket 90 has an opening 91 alined with the particular selector finger 92 in question, the weight 81 of the dog will have sufficient force to swing the lever 83 and carry said finger 92 into said opening, thus permitting the tooth 80 of the dog to engage between the lugs 77 of the plunger rod 26, as illustrated in Fig. 6. The cam 72 now operates to swing the rock shaft 75, and consequently the crank arms 76, and the plunger in question will move forwardly. As it does so, the rock shaft 82 reverses its movement to lift all the selector fingers 92, thus disengaging the particular one in question from the opening in the ticket, and said ticket is expelled, as illustrated in Fig. 7. During a complete reciprocation of the plunger rods, the return movement of the conveyer rock shafts 34 takes place. On the other hand, assume that a ticket comes beneath a selector finger 92, and does not have an opening that registers with said selector finger. Such a disposition of parts is illustrated in Fig. 8. In this case, the selector finger 92 comes down upon the ticket and can move no farther. Therefore the rear edge 85 of the lever 83 holds the tooth 80 of the dog out of its socket, and as the arm 76 carrying the dog moves forwardly, said dog will be inactive, will merely push the track element 86 out of the way and slide along the plunger. After passing the track element 86, the latter will swing to its vertical position so that upon the return movement, the tooth will ride along the lower edge 89 and be returned to a position to operate. Inasmuch as the plunger rod 26 was not actuated, it will be evident that the ticket has not been disturbed, so that upon the next movement of the conveyer, it will be carried to the next plunger. If the opening in said ticket now alines with the plunger, it will be expelled, if not, it will be moved on and so through the machine until it reaches the proper ejector. If, however, from any cause, it should pass all of them, when it reaches the final one, which is shown in Fig. 19, this plunger reciprocates each time as will be evident, because the tooth 80 of the dog is always engaged between the lugs 77 and consequently tickets, which fail to be sorted from any reason, are delivered into the final compartment.

As already explained, and as shown in Fig. 12, the guide rail 31 is vertically movable and during the movement of the tickets along the passageway, it is in its depressed position so that said tickets cannot accidentally move outwardly, and thus become lodged. It will be evident, however, that when the ejecting or expelling operation takes place, this rail must be out of the way in order to permit tickets to pass under it into the different compartments 25. To secure this operation, the rock shaft 65, which carries the stop or separating fingers 66, is also provided with rearwardly extending bracket arms 98 having upturned terminals 99 that embrace the supporting arm 42 for the rail. Consequently when the shaft 65 is turned in one direction, the arms 98 being raised, will elevate the supporting arms 32 and thus said rail. When turned in an opposite direction, the said rail can drop. This elevating movement is timed to take place just prior to the ejecting operation so that when said ejecting operation occurs, the rail will be elevated, but during the movement of the tickets along the passageway, the rail is depressed. The plunger rods, as illustrated in Fig. 7, carry the tickets into the compartments, this view illustrating one of the rods during the ejecting movement prior to its completion. The said rods move to a sufficient extent to bring their slotted ends into the compartments, in order to detach the tickets therefrom and prevent their retrograde movement back into the passageway, stripping devices are employed in the form of swinging fingers 100 that are pivotally mounted on the vertically swinging rail 31, the said devices being pushed aside by the tickets expelled and dropping behind the same in a manner well understood.

To recapitulate briefly the general operation of the machine, the tickets, cards or other articles to be sorted are placed in the magazine 24, and are carried step by step through the passageway, being presented successively to each ejecting mechanism, the operation of which is controlled by the selector for the same. When a ticket or card reaches an ejecting mechanism that has a selector finger, which will move into the opening in said ticket or card, then the ejecting plunger is connected to the operating means for said plunger, and the card or ticket is deposited in the proper compartment 25. This operation may occur with one, two, three or any number of plungers at the same time, depending upon the appropriate tickets alining with their respective selectors.

It will be evident that the mechanism may be employed for sorting tickets of various characters and types. Thus it may be employed for classifying tickets according to the destinations of the same, each station having a selector receiving opening located at a predetermined point different from those of the others. It is also desirable to assort them according to the points of departure. It will therefore be evident that each ticket may be provided with two or more openings so that they may be passed through different machines, and after having been classified for one purpose, can be reclassified for another.

From the foregoing, it is thought that the construction, operation and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In sorting mechanism of the character set forth, the combination with a passageway for the articles to be sorted, of a series of mechanisms for expelling the different articles out of said passageway at different points along the same, and means tending to operate each and every mechanism and controlled by the arrival of the proper article into association with each expelling mechanism designed to expel that article.

2. In sorting mechanism of the character set forth, the combination with a passageway for the articles to be sorted, of a series of independently or simultaneously movable expelling devices for ejecting the articles from said passageway, said expelling devices being arranged along the said passageway.

3. In sorting mechanism of the character set forth, the combination with a passageway for the articles being sorted, means for carrying the articles along said passageway by a step-by-step movement, of a series of movable expelling devices before which the articles are successively presented, and operating means automatically thrown into engagement with the said devices by the arrival of the proper article into association with the proper expelling device.

4. In sorting mechanism of the character set forth, the combination with a passageway for articles to be sorted, of a series of receivers for the different articles located at one side of such passageway, a series of devices for expelling the different articles transversely, of the passageway, each into its proper receiver, and a mechanism automatically connected with one or more of the said devices and governed by the arrival of the proper article or articles into association with the expelling mechanism designed to expel said article or articles.

5. In sorting mechanism of the character set forth, the combination with a passageway for the articles to be sorted, of receivers for the articles located at one side of the passageway, an expelling device for each receiver movable transversely across the passageway to push said articles out of the passageway and into said receivers and a mechanism arranged to operate one or more expelling devices at a time.

6. In sorting mechanism of the character set forth, the combination with a passageway for articles to be sorted, of a series of receivers for the articles located at one side of the passageway, a series of reciprocatory plungers, one associated with each receiver and movable transversely across the passageway at different points for moving articles out of said passageway into the receivers a periodically opening gate between the receiver and passageway, and means for moving the plungers when the gate is open.

7. In sorting mechanism of the character set forth, the combination with a single track or guideway, and means for carrying a series of cards or tickets successively therealong, of means for singly or collectively selecting and removing different cards or tickets at different points along the track or guideway, said means being normally out of actuation but being put in actuation by the arrival of the proper card or ticket at the proper selecting point.

8. In mechanism of the character set forth, the combination with a track or guideway for the articles to be sorted including a movable rail, of receivers associated with the movable rail, means for moving the rail, and means for expelling articles from the track or guideway into the receivers when the rail is moved.

9. In sorting mechanism of the character set forth, the combination with a track or guideway for the articles to be sorted, including a movable rail, of receivers located alongside the movable rail, means for periodically raising and lowering the rail, and means for expelling the articles from the track or guideway into the receivers when the rail is raised.

10. In sorting mechanism of the character set forth, the combination with a track or guideway for the articles to be sorted, including a movable rail, of receivers associated with the movable rail, swinging supports for said rail, a rock shaft having arms associated with the supports for swinging the same to raise and lower the rail, a cam for operating the shaft, and means for expelling the articles from the track or guideway into the receivers when the rail is moved to a predetermined position.

11. In sorting mechanism of the character set forth, the combination with a passageway for the articles to be sorted, of transversely moving fingers for selecting and removing the articles from said passageway, and devices connected to the passageway for detaching the articles from said fingers after their movement thereby.

12. In sorting mechanism of the character set forth, the combination with a passageway for the articles to be sorted, of plungers movable in opposite directions for engaging and moving the articles transversely from said passageway, and detents which engage the articles to prevent their retrograde movement with the plungers back into said passageway.

13. In sorting mechanism of the character set forth, the combination with a track or guideway for the articles to be sorted including a movable rail, of receivers associated with the movable rail, means for moving the rail, means for expelling the articles from the track or guideway into the receivers when the rail is moved to a predetermined position, and detents mounted on the rail for preventing the return of the articles removed from the track or guideway.

14. In sorting mechanism of the character set forth, the combination with a track or guideway for the articles to be sorted including a vertically swinging rail, of receivers located alongside the rail, means for periodically elevating and lowering the rail, means for expelling the articles from the track or guideway into the receivers when the rail is elevated, and swinging detents mounted on the rail and engaging behind the articles expelled to prevent their return movement into the track or guideway.

15. In mechanism of the character described, the combination with selecting mechanism, of a reciprocatory conveyer having a rocking movement in one direction in engagement with the articles to be sorted, and a movement in the other direction out of engagement therewith.

16. The combination with selecting mechanism, of article conveying means associated therewith, said means comprising a conveyer movable in opposite directions and including article-engaging devices movable therewith, means for moving the devices to an inactive position out of engagement with the articles during their movement in one direction, and means for moving said devices to an active position to engage with said articles when moved in an opposite direction.

17. The combination with selecting mechanism, of article conveying means associated therewith, said means including a longitudinally reciprocatory rock shaft, article-engaging fingers associated with the rock shaft, and means for rotating and reciprocating the shaft to engage said fingers with the articles being sorted upon reciprocation of the rock shaft in one direction and to disengage said fingers upon a reciprocation in the opposite direction.

18. The combination with selecting mechanism, of article-conveying means associated therewith, said means including a reciprocatory rock shaft, article-engaging fingers associated with the rock shaft, a cam for rotating the shaft, another cam, and means operated by the latter cam and connected to the shaft for moving the same longitudinally in opposite directions.

19. The combination with selecting mechanism, of article-conveying means associated therewith, said means including a plurality of reciprocatory rock shafts, article-engaging fingers carried thereby, and means for rotating the rock shafts and causing their reciprocatory movements.

20. The combination with selecting mechanism, of article-conveying means associated therewith, said means including a plurality of reciprocatory rock shafts, gearing connecting the rock shafts for causing their simultaneous rotation, article-engaging fingers carried by the rock shafts, a cam, means operated by the cam and connected to the rock shaft for rotating them, another cam, and means operated by the latter cam and connected to the rock shafts for effecting their reciprocatory movement.

21. In sorting mechanism of the character set forth, the combination with a magazine for the articles to be sorted, of a passageway for said articles extending from the magazine, selecting mechanism associated with the passageway, and a longitudinally reciprocatory conveyer for the articles also associated with the passageway.

22. In sorting mechanism of the character set forth, the combination with a magazine for the articles to be sorted, of a passageway for such articles extending from the magazine, selecting mechanism associated with the passageway, reciprocatory rock shafts located longitudinally of said passageway and having article-engaging fingers, and means for reciprocating and rotating the shafts.

23. The combination with selecting mechanism, of a conveyer carrying the articles to be sorted past said selecting mechanism, said conveyer being movable in opposite directions, and means permitting the carriage of the articles in one direction by said conveyer, but preventing movement of said articles when the conveyer moves in an opposite direction.

24. The combination with selecting mechanism, of article-conveying means associated therewith and movable in opposite directions, and means movable to and from positions between the articles for permitting the movement of said articles in one direction by the conveying means and preventing their movement in an opposite direction by said means.

25. The combination with selecting mechanism, of article-conveying means associated therewith and movable in opposite directions, a rock shaft, and holding fingers carried by the shaft and movable to and from positions between the articles for holding said articles against movement in one direction by the conveying means.

26. The combination with selecting mechanism, of a reciprocatory conveyer, swinging holder fingers, means for reciprocating the conveyer, and means for holding the fingers depressed between the articles during the movement of the conveyer in one direction and elevated out of the path of movement of the articles during the movement of the conveyer in an opposite direction.

27. In mechanism of the character set forth, the combination with a magazine for the articles to be sorted, of a track or guideway extending therefrom, a conveyer associated with said track or guideway and comprising rock shafts having a reciprocatory movement, a cam, means operated by the cam for rotating the shafts, another cam, means operated by the second cam for reciprocating the shafts, another rock shaft, stop fingers carried by the same and movable into and out of the track or guideway, a third cam, and means operated by the third cam and connected to the last mentioned rock shaft for effecting its rotary movement at predetermined intervals.

28. In mechanism of the character set forth, the combination with a passageway for the articles to be sorted, a periodically-operated gate opening to permit the articles to be removed from the passageway, of a plurality of devices located at different points along the passageway for removing the articles therefrom, means movable along the passageway for carrying the article into position before each of the removing devices and means movable into and out of the passageway for positioning the articles with respect to the removing devices.

29. In sorting mechanism of the character set forth, the combination with a passageway for the articles to be sorted, of a plurality of receivers for the sorted articles, an automatically-operated gate between the passageway and receivers, devices operating transversely of the passageway for expelling the articles therefrom into the receivers when the gate is open, and devices for preventing the movement of said articles longitudinally along the passageway during the expelling operation.

30. In sorting mechanism of the character set forth, the combination with a passageway for the articles to be sorted, of a plurality of receivers for the sorted articles located alongside the passageway, means for moving the articles step by step along said passageway, and intermittently-operated devices movable singly or collectively for delivering the devices from the said passageway, said devices and moving means operating alternately.

31. In sorting mechanism of the character set forth, the combination with a passageway for the articles to be sorted, of a plurality of receivers for the sorted articles located alongside the passageway, a reciprocatory conveyer having a movement in one direction to individually engage and move the articles longitudinally of the passageway and having a return movement, and means operating transversely of the passageway during the return movement of the conveyer to remove the articles from said passageway into the receivers.

32. In sorting mechanism of the character set forth, the combination with a passageway for the articles to be sorted, of a plurality of receivers for the sorted articles located alongside the passageway, a conveyer comprising reciprocatory shafts having article-engaging fingers, means for rotating and reciprocating the shafts, and plungers operating transversely of the passageway for removing the articles therefrom and depositing them in the receivers.

33. In sorting mechanism of the character set forth, the combination with a track or guide including a movable rail, of a conveyer associated with the track or guide and comprising reciprocatory shafts having spaced article-engaging fingers, means for rotating and reciprocating the shafts to carry the articles with a step by step movement along the track or guide, plungers operating transversely of the track or guide, means for effecting the operation of the said plungers during the movement of the shafts in one direction, and means for elevating the movable rail to permit the plungers to pass therebeneath.

34. In sorting mechanism of the character set forth the combination with a passageway along which the articles to be sorted are carried, a periodically opening gate at one side thereof, and a plurality of movable sorting devices located successively along said passageway for removing the tickets when the gate opens, of means for presenting the articles to be sorted successively to said devices.

35. In sorting mechanism of the character set forth, the combination with means for carrying articles to be sorted along a predetermined path of movement, of selecting devices located at different points along the path of movement and capable of simultaneous operation, and ejectors put into action by said selecting devices and operating to push said articles from the said path of movement.

36. In sorting mechanism of the character set forth, the combination with a plurality of independent sorting devices, of a conveyer passing before the sorting devices for presenting articles successively to said devices and means for giving the conveyer a step-by-step motion.

37. In sorting mechanism of the character set forth, the combination with a plurality of separately movable ejecting devices normally out of actuation, of means for presenting a plurality of articles successively to said devices, and means controlled by said articles when so presented for actuating one or any number of ejecting devices at a time to remove said articles.

38. In sorting mechanism of the character set forth, the combination with a plurality of separately movable ejecting devices, of actuating means for any number of said ejecting devices, and means controlled by the articles to be sorted when presented before the proper ejecting device for engaging the ejecting devices with the actuating means to remove one or more articles.

39. In sorting mechanism of the character set forth, the combination with a plurality of separately movable ejecting devices, of common actuating means for all of the said ejecting devices, and means controlled by the articles sorted for engaging the ejecting devices with the actuating means to remove said article.

40. In sorting mechanism of the character set forth, the combination with a plurality of separately-movable article-removing devices, of means for presenting the articles successively to said devices, and a selector for each article-removing device adapted to be engaged by the proper article when presented thereto, and a mechanism controlled by the selectors for operating one or any number of said devices at a time.

41. In sorting mechanism of the character set forth, the combination with a plurality of separate article-removing devices, of means for presenting articles successively to different article-removing devices, common actuating means for said devices, and mechanism controlled by the articles presented for separately engaging the article-removing devices with the common actuating means.

42. In sorting mechanism of the character set forth, the combination with a plurality of separate article removing devices, of means for presenting articles successively to each of the different article removing devices, common actuating means for said devices, and mechanism, controlled by the articles presented, for separately engaging a removing device and the actuating means, said mechanism including a selector associated with each removing device.

43. In sorting mechanism of the character set forth, the combination with a passageway for the articles to be sorted, of a plurality of separate ejecting devices located alongside the passageway and normally out of actuation, means for intermittently moving the articles alongside the passageway from one ejecting device to the next, and a selector associated with each ejecting device and controlled by the articles presented thereto for actuating the associated ejector.

44. In sorting mechanism of the character set forth, the combination with a passageway for the articles to be sorted, of a plurality of separate ejecting plungers located along the passageway and operating transversely thereof, means for intermittently moving the articles along the passageway from one plunger to the next, and a selector associated with each plunger and movable into and out of the passageway, said selectors being controlled by the articles presented to the plungers and governing the operation of said plungers.

45. In sorting mechanism of the character set forth, the combination with a movable article-moving device, of operating means therefor movable independently of said device, and means controlled by articles presented to the device for connecting the operating means to said device.

46. In sorting mechanism of the character set forth, the combination with a movable article-moving device, of operating means therefor movable independently of said device, a dog for detachably connecting the operating means and device, and mechanism for governing the operation of the dog.

47. In sorting mechanism of the character set forth, the combination with an article-moving member, of an operating member, a shoulder on one member, a dog on the other member movable into and out of coaction with the shoulder, and means for governing the movement of the dog to permit or prevent its movement into coaction with the shoulder.

48. In sorting mechanism of the character set forth, the combination with a plunger having a shoulder, of a swinging operating device, a dog pivoted on the operating device and movable into and out of coaction with the shoulder, and means for governing the movement of the dog to permit or prevent its movement into coaction with the shoulder and the consequent operation of the plunger by the operating device.

49. In sorting mechanism of the character set forth, the combination with an article-moving member, of an actuating member for the same including a device that connects and disconnects the members, and means controlled by the articles to be moved for governing the operation of the connecting device.

50. In sorting mechanism of the character set forth, the combination with an article-moving member, of an actuating member for the same including a device that connects and disconnects the members, and a swinging article-engaging device for governing the operation of the connecting device.

51. In sorting mechanism of the character set forth, the combination with an article-moving member, of an actuating member for the same including a device that connects and disconnects said members, a movable article-engaging device for governing the operation of the connecting device, and means for moving the article-engaging device toward and from the articles presented to the moving member.

52. In sorting mechanism of the character set forth, the combination with an article-moving member, of an actuating member therefor, a dog carried by one member and movable into and out of coaction with the other member, and a movable article-engaging selector for governing said movement of the dog.

53. In sorting mechanism of the character set forth, the combination with an article-moving member, of an actuating member therefor, a dog carried by one member and movable into and out of coaction with the other member, a movable article-engaging selector for governing said movement of the dog, and means for automatically moving the selector.

54. In sorting mechanism of the character set forth, the combination with an article-moving member, of an actuating member, a shoulder carried by one member, a dog carried by the other member and movable into and out of coaction with the shoulder, and a swinging selector having a portion on which the dog can ride and which is movable to a position to prevent the movement of said dog into coaction with the shoulder.

55. In sorting mechanism of the character set forth, the combination with an article-moving member, of an actuating member, a shoulder carried by one member, a dog carried by the other member and movable into and out of coaction with the shoulder, a swinging selector having a portion on which the dog can ride and which is movable to a position to prevent the movement of said dog into coaction with the shoulder, and a track pivoted to the selector for directing the dog on to said portion.

56. In sorting mechanism of the character set forth, the combination with a plunger, of actuating means therefor, a dog mounted on the actuating means and movable into and out of coaction with the plunger, a rock shaft, a selector loosely journaled on the rock shaft and having a device which engages the dog to prevent its movement into coaction with the plunger, and means carried by the rock shaft for limiting the independent movement of the selector thereon.

57. In sorting mechanism of the character set forth, the combination with a reciprocatory plunger having a shoulder, of a swinging actuating device therefor, a dog pivoted on the actuating device and movable into and out of coaction with the shoulder, a rock shaft, a selector lever loosely journaled on the rock shaft and having a portion arranged to hold the dog out of coaction with the shoulder, a track pivoted to the lever and constituting means for directing the dog against said portion, means connected to the rock shaft for swinging the lever in opposite directions, and means for operating the shaft.

58. In sorting mechanism of the character set forth, the combination with a passageway for cards or tickets, of an expelling plunger that operates across the same, means for presenting cards or tickets successively to said plunger, operating means for the plunger, movable into and out of coaction therewith, and a selector movable into and out of the passageway and controlled by the cards or tickets for permitting or preventing the coaction of the actuating means with the plunger.

59. In sorting mechanism of the character set forth, the combination with a magazine for cards or tickets, of a track or guide extending therefrom, a plurality of receivers located alongside the track or guide, a plurality of plungers moving transversely of said track or guide and associated with the different receivers, means for moving cards or tickets from the magazine successively along the track or guide to positions between the plungers and receivers, actuating means for said plungers, and selectors that coöperate with the different cards or tickets for determining the operation of each plunger by said actuating means.

60. In sorting mechanism of the character set forth, the combination with a magazine for cards or tickets, of a track or guideway extending from the same and including a vertically swinging rail, a plurality of plungers operating transversely of the track or guideway and movable beneath the rail, a conveyer comprising reciprocatory rock shafts having card or ticket engaging fingers, means for rotating and reciprocating the rock shafts, a swinging actuating member for all of the plungers, dogs pivoted on the member and movable into and out of coaction with the different plungers, a pivoted selector lever for each plunger that is movable into and out of coaction with the different cards or tickets and when held in a predetermined position thereby holds a dog out of coaction with a plunger, means for raising the rail upon the operation of the plungers, and means for holding the cards or tickets against movement along the track or guideway during the operation of the plungers.

61. In sorting mechanism of the character set forth, the combination with a passageway for cards or tickets, of means for moving cards or tickets along said passageway, plungers transversely movable to the passageway and controlled by said cards or tickets for ejecting the same at different points along said passageway, and a mechanism through which any one or more plungers are operatively related for ejecting one or more tickets from the passageway at one time.

62. In sorting mechanism of the character set forth, the combination with a frame, of a ticket passageway located therein, means for moving tickets step by step along said passageway, selector mechanism for determining the ejection of said tickets at different points along the passageway, means for holding the tickets in position to be ejected during such ejecting operation, and an automatically-operated gate arranged to open for the ejection of tickets.

63. In sorting mechanism of the character set forth, the combination with a magazine for cards or tickets, of a passageway for said cards or tickets extending therefrom, means for moving cards or tickets successively from the magazine and along said passageway, and mechanism for rotating and reciprocating the means to alternately move the cards or tickets along the passageway and release them.

64. In sorting mechanism of the character set forth, the combination with a passageway for cards or tickets, of means for moving the cards or tickets successively along said passageway, means for ejecting the one or a plurality of tickets at one time at different points along the passageway, and selector means associated with said ejector means for determining the ejection of a ticket by said ejecting means.

65. In sorting mechanism of the character set forth, the combination with a passageway for tickets, and a series of selecting and removing devices located along said passageway, of means for carrying tickets step-by-step along said passageway, stop fingers associated with said selecting and removing devices, and means for causing said stop fingers to rise between said tickets after each forward movement of the same.

66. In sorting mechanism of the character set forth, the combination with a passageway for cards or tickets having openings therethrough at different points, of means for moving the cards or tickets along said passageway, means for expelling the cards or tickets from said passageway at different points, and controlling mechanism for said expelling mechanism including fingers that engage in the openings of the cards or tickets when said openings register therewith.

67. In mechanism of the class described, the combination with a passageway for the articles being sorted, of a selecting device consisting of a finger adapted to enter a relatively positioned opening in the article being sorted, and means put into actuation by the finger for relatively moving the article transversely of the passageway to eject the article engaged thereby from the remainder of said articles in the passageway.

68. In mechanism of the class described, the combination with a passageway for the articles being sorted, of a series of selectors associated with the passageway, each including a projecting portion adapted to engage with a corresponding recess in the article, the projecting portion on each selector being differently arranged to the projecting portion of all the other selectors, and means put into actuation by the movement of said selectors, acting to eject the article engaged by the selector from the remainder of said articles.

69. In mechanism of the class described, the combination with a passageway for the articles being sorted, of a series of selectors associated with the passageway, each including a projecting portion adapted to engage with a corresponding recess in the article, the projecting portion on each selector being differently arranged from the projecting portion of all the other selectors, a transversely movable ejector associated with each selector, and means for giving to any of the ejectors a reciprocating movement transversely to the passageway to eject the article engaged thereby from the remainder of said articles upon the engagement of the projecting portion of the associated selector with the said corresponding recess in the article.

70. In a card or ticket sorting mechanism, the combination with a passageway for cards or tickets, of a series of plungers associated with the passageway, a series of selector fingers associated with the plungers, the selector finger of each plunger being differently positioned to that of all the others, and each adapted to engage with a correspondingly positioned recess in said card or ticket, and means for giving any plunger a reciprocation transverse to the passageway upon the engagement of its selector finger with said recess in the card or ticket.

71. In card or ticket sorting mechanism, a passageway for the tickets, means for causing the tickets to have a step-by-step movement along the passageway, a series of selector fingers, each finger being differently arranged to all the other fingers in relation to said passageway, and each adapted to engage with a correspondingly arranged recess in any ticket, and means for giving to the ticket a movement of ejection across the passageway when anyone of said fingers enters the opening in the ticket.

72. In mechanism of the class described, a passageway for cards or tickets, a series of ejector plungers mounted along said passageway and operating transversely thereof, a series of pivoted selector fingers extending into the passageway, one selector finger being associated with each of said plungers, each of said selector fingers being differently arranged to all the other fingers and adapted to engage with a correspondingly positioned recess in the cards or tickets and to ride over the unrecessed portion of the card or ticket, and means whereby upon the engagement of a selector finger with the card or ticket, the plunger shall be moved transversely of the passageway to eject the same.

73. In mechanism of the class described, a passageway for the cards or tickets, a series of receivers associated with said passageway, a series of ejecting plungers operating transversely to the passageway, one plunger opposite each of said receivers, actuating means for said plungers normally out of engagement therewith, means for moving the tickets by a step-by-step motion into position before each of the plungers successively, and depending fingers associated with the plungers, each finger being differently positioned relatively to all the other fingers, said fingers being adapted to fall into corresponding openings formed in the tickets and when so fallen to engage the associated plunger with the actuating mechanism to carry the ticket into said receivers upon a movement of the plunger.

74. In mechanism of the class described, a passageway, means for carrying cards or tickets along said passageway, a series of receivers associated with the passageway, a series of transversely moving plungers associated with said passageway, pivoted selecting fingers associated with the plungers and adapted to contact with the cards passing along the passageway, engage with openings in the cards or tickets, and when so engaged to actuate the plungers to reciprocate across the passageway and eject the ticket into the receivers, and means for holding the tickets from longitudinal movement along the passageway between each forward step-by-step movement of the ticket.

75. In mechanism of the class described, a passageway for cards or tickets, means for intermittently moving the cards or tickets along said passageway, means alternately raised and lowered to engage between adjacent cards or tickets for holding the latter in position between each forward movement, a series of selecting and ejecting devices adapted to engage with the proper card or ticket, and means operating said selecting and ejecting devices to eject a card or ticket with which the selecting devices engage upon the cards or tickets coming into position before the proper selecting and ejecting devices.

76. In mechanism of the class described, a passageway for the cards or tickets, a longitudinal reciprocating rock shaft beneath the passageway, fingers projecting from the rock shaft and adapted to turn upward and into engagement between the tickets upon one portion of the rotation of the rock shaft, and out of engagement with the tickets upon another portion of said rotation, and a series of ejecting devices associated with the passageway and adapted to engage with said cards or tickets as they are brought opposite to said ejecting devices.

77. In mechanism of the class described, a passageway for the cards or tickets, means for carrying said cards or tickets by a step-by-step motion along the passageway, a series of independent plungers mounted along said passageway, actuating means adapted to move any one of said plungers transversely to the passageway, fingers mounted in association with each one of said plungers and adapted to engage with corresponding cards or tickets moving along said passageway, and means whereby upon the engagement of the fingers with the card or ticket, its plunger shall be connected to the operating means.

78. In mechanism of the class described, a passageway for the cards or tickets, means for intermittently moving the cards or tickets along the passageway, a series of supports mounted along the passageway, plungers laterally slidable on said supports, each plunger being independent of all the others, fingers associated with the plungers and adapted to engage with openings in said cards or tickets, actuating means adapted to move the plungers laterally to eject the tickets, and means whereby upon the engagement of any finger with a card or ticket, the plunger associated therewith shall be engaged with said actuating means and shifted along said support transversely of the passageway to eject the ticket.

79. In mechanism of the class described, a passageway for the cards or tickets, means for intermittently moving the cards or tickets along the passageway, a series of plungers laterally movable, each plunger being independent of all the others, selector fingers associated with the plungers and adapted to engage with the openings in said cards or tickets, actuating means adapted to move the plungers laterally but normally out of engagement thereof, means whereby upon the engagement of any selector finger with a card or ticket, the plunger associated therewith shall be engaged with said actuating means and shifted laterally to eject the ticket, and means for disengaging the selector fingers from the card or ticket upon the ejecting movement of its associated plunger.

80. In mechanism of the class described, a passageway, means for carrying the cards or tickets intermittently along said passageway, a rock shaft mounted parallel with the passageway, and a series of positioning fingers mounted on the rock shaft and adapted upon a reciprocation of the shaft to be forced into said passageway between the cards or tickets between each intermittent movement thereof.

81. In mechanism of the class described, a passageway, means for intermittently moving a series of cards or tickets along said passageway, a rock shaft parallel with the passageway, means for rocking said shaft at the end of every intermittent forward movement of the tickets, and a series of arms projecting from the rock shaft into the passageway, having projecting fingers adapted to extend between the tickets when the rock shaft is actuated.

82. In mechanism of the class described, a passageway for cards or tickets, a rock shaft mounted within the passageway, means for reciprocating the rock shaft, fingers upon the shaft adapted, when the rock shaft is moved forward, to extend up between the tickets and carry them along therewith and to be moved out of engagement with the tickets by a further rotation of the rock shaft, and a rock shaft parallel to the passageway having projecting therefrom a series of arms spaced apart from each other the length of a ticket and having depending therefrom fingers adapted to engage between the tickets, and means for so relatively rotating the ticket-moving rock shaft and the ticket-holding rock shaft that when the fingers of the first rock shaft are depressed, the fingers of the second rock shaft shall engage between the tickets.

83. In mechanism of the class described, a passageway for cards or tickets, parallel rock shafts slidably mounted in the passageway, having fingers engaging with the cards or tickets to move the same, means for reciprocating said rock shafts and rotating the same at the end of each reciprocation, a rock shaft parallel to the passageway having a series of arms projecting therefrom provided with depending fingers adapted to engage between the tickets to hold the same from movement at the end of each reciprocation of the ticket-moving rock shaft, means for relatively moving the ticket-moving rock shaft and the ticket-holding rock shaft, a series of laterally-movable plungers mounted between each of the ticket-holding arms, said plungers being normally out of actuation, a finger associated with each plunger and each differently positioned relatively to the other fingers adapted to engage with an opening in a proper ticket, means adapted to transversely move any or all of said plungers to eject the ticket, and means for engaging anyone of the plungers with said actuating means when the finger associated with that plunger engages with said card or ticket, said actuating means being operative when the ticket is being held from longitudinal movement along the passageway.

In testimony, that I claim the foregoing as my own, I have hereto affixed my signature in the presence of two witnesses.

ARCHIBALD PICKEN.

Witnesses:
H. C. DEULINGER,
JOHN J. LAWRENCE.